(12) United States Patent
Shimakage et al.

(10) Patent No.: US 7,117,076 B2
(45) Date of Patent: Oct. 3, 2006

(54) LANE KEEP CONTROL APPARATUS AND METHOD FOR AUTOMOTIVE VEHICLE

(75) Inventors: Masayasu Shimakage, Yokohama (JP); Shinji Matsumoto, Kanagawa (JP); Satoshi Tange, Kanagawa (JP); Genpei Naito, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/982,878

(22) Filed: Nov. 8, 2004

(65) Prior Publication Data

US 2005/0107931 A1   May 19, 2005

(30) Foreign Application Priority Data

Nov. 13, 2003 (JP) .............................. 2003-384196

(51) Int. Cl.
*G06F 7/00* (2006.01)
*G05D 1/02* (2006.01)

(52) U.S. Cl. .................... 701/41; 180/410; 340/438

(58) Field of Classification Search ................ 701/41, 701/42; 180/410, 412, 415, 422, 443, 446, 180/168, 167; 340/438, 439, 903, 988
See application file for complete search history.

(56) References Cited

U.S. PATENT DOCUMENTS

| | | | |
|---|---|---|---|
| 5,483,453 A * | 1/1996 | Uemura et al. | 701/23 |
| 5,485,378 A | 1/1996 | Franke et al. | |
| 5,765,116 A * | 6/1998 | Wilson-Jones et al. | 701/41 |
| 5,913,375 A * | 6/1999 | Nishikawa | 180/168 |
| 5,999,874 A * | 12/1999 | Winner et al. | 701/93 |
| 6,324,452 B1 * | 11/2001 | Ikegaya | 701/41 |
| 2002/0052681 A1 * | 5/2002 | Matsuno | 701/70 |
| 2003/0097206 A1 | 5/2003 | Matsumoto et al. | |
| 2004/0183563 A1 | 9/2004 | Shimakage | |
| 2004/0186650 A1 | 9/2004 | Tange et al. | |
| 2004/0186651 A1 | 9/2004 | Tange et al. | |
| 2004/0215393 A1 | 10/2004 | Matsumoto et al. | |
| 2005/0182539 A1 * | 8/2005 | Maass | 701/41 |

FOREIGN PATENT DOCUMENTS

| | | |
|---|---|---|
| EP | 0806336 A2 | 11/1997 |
| JP | 11-96497 A | 4/1999 |
| JP | 2001-310719 A | 11/2001 |

OTHER PUBLICATIONS

U.S. Appl. No. 11/001,156, filed Dec. 2, 2001, Matsumoto et al.
U.S. Appl. No. 11/001,185, filed Dec. 2, 2004, Matsumoto et al.
U.S. Appl. No. 10/994,319, filed Nov. 23, 2004, Tange et al.
U.S. Appl. No. 10/828,462, filed Apr. 21, 2004, Matsumoto et al.

* cited by examiner

*Primary Examiner*—Dalena Tran
(74) *Attorney, Agent, or Firm*—Foley & Lardner LLP

(57) ABSTRACT

In lane keep control apparatus and method for an automotive vehicle, a traveling state of the vehicle is detected, a determination is made on whether the vehicle has a tendency of a deviation from the traveling traffic lane according to the detected traveling state, a deviation avoidance control is executed for the vehicle in a direction to avoid the deviation according to the traveling state, steering angles before and after a start of the deviation avoidance control are detected, and a controlled variable of the deviation avoidance control is detected on the basis of a deviation between a steering angle before the start of deviation avoidance control and that after the start of deviation avoidance control when a determination is made that the vehicle has the tendency of the deviation.

20 Claims, 9 Drawing Sheets

TRAVELING VELOCITY V OF VEHICLE

LANE KEEP CONTROL APPARATUS AND METHOD FOR AUTOMOTIVE VEHICLE

BACKGROUND OF THE INVENTION

1. Field of the Invention

The present invention relates to lane keep control apparatus and method for an automotive vehicle which are capable of preventing a deviation of the vehicle from a traffic lane on which the vehicle is traveling when the vehicle is about to deviate from the traffic lane during the travel.

2. Description of the Related Art

A Japanese Patent Application First Publication No. Heisei 11-96497 published on Apr. 9, 1999 exemplifies a first previously proposed lane keep control apparatus. In the first previously proposed lane keep control apparatus, the control apparatus determines that the vehicle has a tendency of deviation of the traveled position of the vehicle from a traveling traffic lane and outputs the steering control torque having a magnitude for a vehicle driver to overcome easily in accordance with a lateral deviation of the traveling position with respect to a reference position of the vehicle traveling position through a steering actuator so that the deviation of the vehicle from the traffic lane is prevented. In addition, a Japanese Patent Application First Publication No. 2001-310719 published on Nov. 6, 2001 exemplifies a second previously proposed lane keep control apparatus for the automotive vehicle. In the second previously proposed lane keep control apparatus, a yaw moment in a direction to avoid the deviation from the traveling traffic lane is developed according to a difference in a braking force between front and left road wheels so as to prevent the vehicle from being deviated from the traffic lane in a case wherein the control apparatus determines that the vehicle has the tendency to be deviated from the traveling traffic lane.

SUMMARY OF THE INVENTION

In the first previously proposed lane keep control apparatus described in the former Japanese Patent Application First Publication, an automatic steering causes the vehicle to be prevented from being deviated from the traffic lane. If, during the automatic steering, the driver steers a steering wheel of the vehicle in a direction opposite to that of the automatic steering, it is necessary to generate a steering torque such as to overcome the steering torque caused by the automatic steering. Thus, a steering burden imposed on the driver is increased. In addition, in a case where only the steering torque which can easily overcome the steering torque of the automatic steering is generated, a sufficiently speedy steering cannot be carried out and a traffic lane deviation preventive performance is consequently weakened. Furthermore, the vehicle driver gives an unpleasant feeling which grasps the steering wheel in a case where a sudden large steering during a traffic lane deviation determination is carried out. A new steering actuator is needed, the number of parts is increased, and a manufacturing cost is increased.

In addition, in the second previously proposed lane keep control apparatus, the traffic lane deviation is prevented from occurring by means of a control of the braking force. During the lane keep prevention control, a yaw moment in a direction to avoid the deviation becomes larger as a manipulated variable of the steering wheel becomes larger irrespective of the fact that the driver can easily steer. Consequently, it becomes difficult for the vehicle to turn round in a direction toward which the driver is steered and a reduction of a vehicle speed becomes large. That is to say, in order to enlarge the effect of the deviation avoidance control, if a gain to calculate the yaw moment from the deviation quantity is set to a large value, the vehicle does not turn round in the way as the vehicle driver has intended so that the vehicle driver deeply gives the unpleasant feeling. If this gain is set to a small value, an increment rate of the yaw moment with respect to a steering variable of the driver becomes small. A sense of incompatibility (unpleasant feeling) that the driver receives is suppressed but the effect of prevention of the vehicle from being deviated from the traveling traffic lane becomes minor.

It is, therefore, an object of the present invention to provide improved lane keep control apparatus and method for an automotive vehicle which are capable of performing a steering intervention without giving the vehicle driver the unpleasant feeling during a deviation avoidance control.

According to one aspect of the present invention, there is provided with a lane keep control apparatus for an automotive vehicle, comprising: a traveling state detecting section that detects a traveling state of the vehicle; a deviation determining section that determines whether the vehicle has a tendency of a deviation from the traveling traffic lane according to the traveling state detected by the traveling state detecting section; a deviation preventive controlling section that executes a deviation avoidance control for the vehicle in a direction to avoid the deviation according to the traveling state detected by the traveling state detecting section; a steering angle detecting section that detects steering angles before and after a start of the deviation avoidance control executed by the deviation preventive controlling section; and a deviation avoidance controlled variable correcting section that corrects a controlled variable of the deviation avoidance control executed by the deviation preventive controlling section on the basis of a deviation between a steering angle before the start of deviation avoidance control and that after the start of deviation avoidance control detected by the steering angle detecting section when the deviation determining section determines that the vehicle has the tendency of the deviation.

According to another aspect of the present invention, there is provided with a lane keep control method for an automotive vehicle, comprising: detecting a traveling state of the vehicle; determining whether the vehicle has a tendency of a deviation from the traveling traffic lane according to the detected traveling state; executing a deviation avoidance control for the vehicle in a direction to avoid the deviation according to the traveling state; detecting steering angles before and after a start of the deviation avoidance control; and correcting a controlled variable of the deviation avoidance control on the basis of a deviation between a steering angle before the start of deviation avoidance control and that after the start of deviation avoidance control when determining that the vehicle has the tendency of the deviation.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

(First Embodiment)

Figure 1:
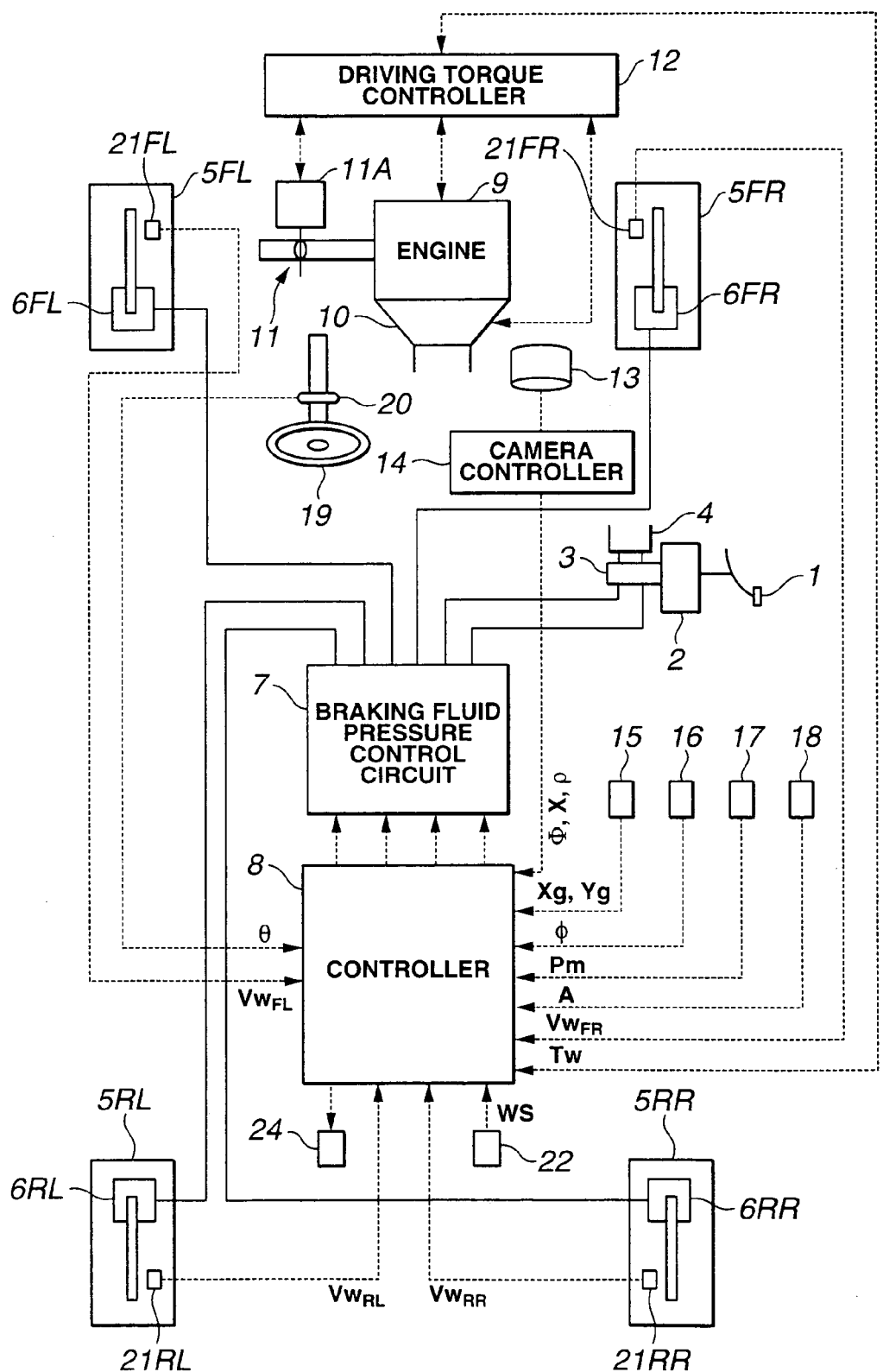
FIG. 1 is a rough configuration view of an automotive vehicle to which a lane keep control apparatus in a first preferred embodiment according to the present invention is applicable.

FIG. 1 shows an automotive vehicle to which a lane keep control apparatus in a first preferred embodiment is applicable according to the present invention. This vehicle is a rear wheel driven vehicle in which an automatic transmission and a conventional differential gear are mounted. A brake device can control a braking force (braking liquid pressure) of each of left and right road wheels between front and rear road wheels, independently of each other. In FIG. 1, a reference numeral 1 denotes a brake pedal, a reference numeral 2 denotes a booster, a reference numeral 3 denotes a master cylinder, and a reference numeral 4 denotes a reservoir. Ordinarily, a braking fluid pressure boosted by means of master cylinder 3 in accordance with a depression depth of brake pedal 1 by the vehicle driver is supplied to each wheel cylinder of front road wheels 5FL and 5FR and rear road wheels 5RL and 5RR. A braking fluid pressure control circuit 7 is intervened between master cylinder 3 and each wheel cylinder 6FL through 6RR. The braking fluid pressure of each wheel cylinder 6FL, 6FR, 6RL, and 6RR can individually be controlled within the braking fluid pressure control circuit 7.

Braking fluid pressure control circuit 7 is a utilization of the braking fluid pressure control circuit used in, for example, an antiskid control and a traction control. In this embodiment, the braking fluid pressure of each wheel cylinder 6FL, 6FR, 6RL, and 6RR can solely be controlled (increased or decreased) independently of each other. The braking fluid pressure of each wheel cylinder 6FL through 6RR in accordance with a braking fluid pressure command value from a controller 8 as will be described later.

In addition, this vehicle is provided with drive torque controller 12 which controls a driving state of engine 9, a selection gear ratio of an automatic transmission 10, and a throttle opening angle of a throttle valve 11 to control a driving torque to rear road wheels 5RL and 5RR which are driven wheels. The driving state control of engine 9, can be carried out, for example, by controlling a fuel injection quantity and an ignition timing and, simultaneously, controlling the opening angle of throttle valve. It is noted that it is possible for driving torque controller 12 to solely control drive torques of rear road wheels 5RL and 5RR which are driven wheels and to control driven wheel torques by referring to the driving torque command value when a command value of the driven torque from controller 8 as described before.

An CCD camera 13 and a camera controller 14 are disposed in the vehicle as a vehicular surrounding sensor used to detect a position of the vehicle within a traveling traffic lane for determining a traveling traffic lane deviation prevention determination of the vehicle. This camera controller 14 detects the traffic lane within which the vehicle is traveling by detecting lane markers such as road block lines from a photographed image located before the vehicular front direction caught (or trapped) by CCD camera 13. Furthermore, yaw angle Φ with respect to the traveling traffic lane, a lateral displacement X from a traffic lane center, a curvature ρ of the traveling traffic lane, and a traffic lane line width L.

Furthermore, detection signals of an accelerator sensor 15 to detect longitudinal acceleration Xg developed on the vehicle and to detect lateral acceleration Yg developed on the vehicle, a yaw rate sensor 16 to detect a yaw rate φ developed on the vehicle, a master cylinder pressure sensor 17, a master cylinder pressure sensor 17 to detect an output pressure of mater cylinder 3, so-called, a master cylinder pressure Pm, a throttle opening angle sensor 18 to detect a throttle opening angle A, a steering angle sensor 20 to detect a steering angle θ of a steering wheel 19 as steering angle detecting means, road wheel velocity sensor 21FL, 21FR, 21RL, and 21RR to detect revolution speed of each road wheel 5FL, 5FR, 5RL, and 5RR, and a direction indicating switch 22 to detect a direction indicating operation by means of a direction indicator are outputted to controller 8. Controller 8 also receives the signals of yaw angle Φ of the vehicle with respect to the traffic lane detected by means of camera controller 14, of lateral displacement X from the center of the traffic lane detected thereby, curvature ρ of the traffic lane detected thereby, traffic lane width L detected thereby, and drive torque Tw controlled by means of driving torque controller 12. It is noted that, in a case where a left-and-right directivity is present in the detected traveling state data, the left direction is a positive direction. That is to say, yaw rate φ, lateral acceleration Yg, and yaw angle Φ indicate positive during the left turn and lateral displacement indicates the positive value when the vehicle is deviated toward the left direction from the center of the traveling traffic lane.

Figure 2:
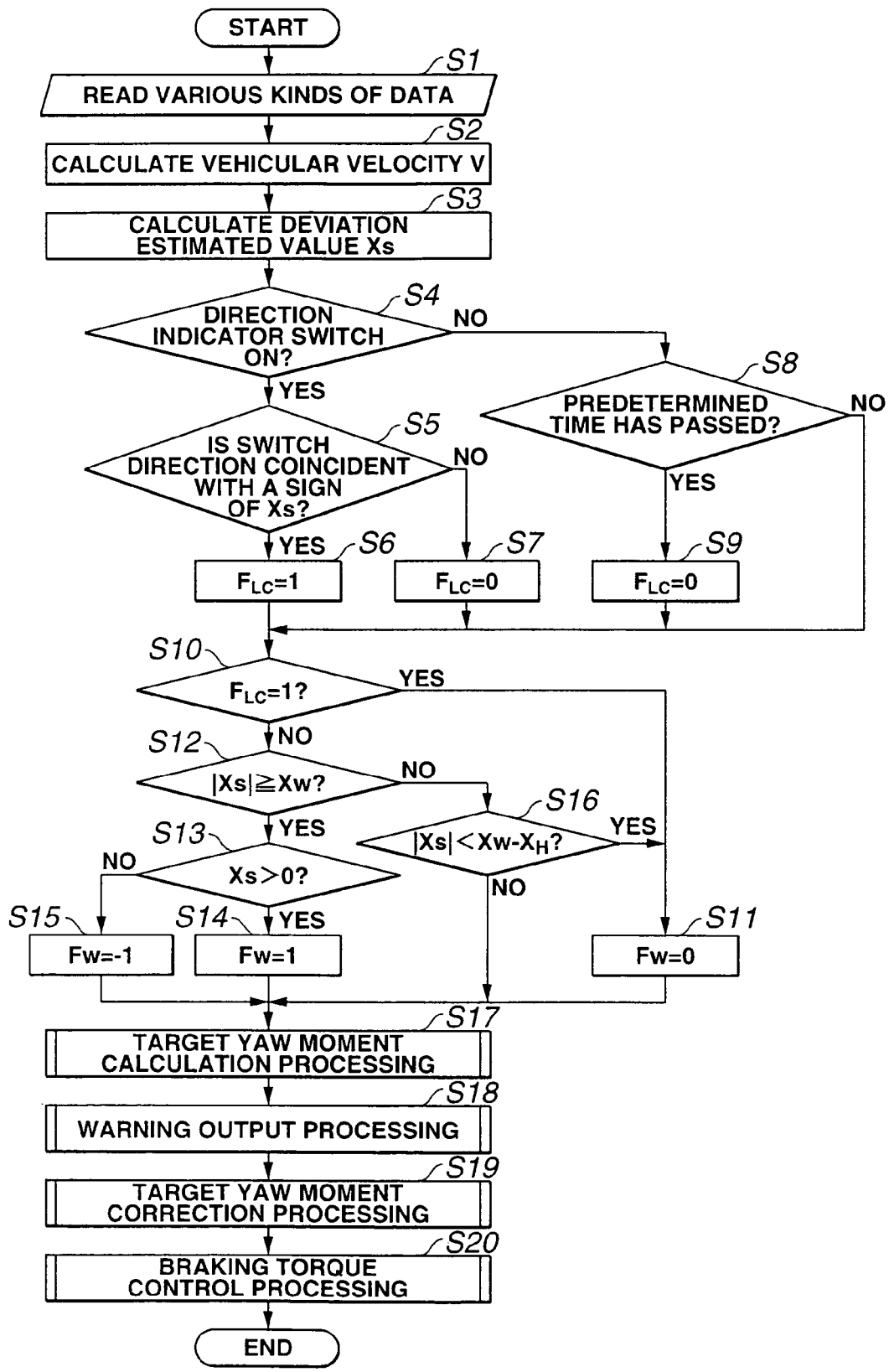
FIG. 2 is an operational flowchart representing a traffic lane deviation preventive control process executed by a controller shown in FIG. 1.

In addition, a warning device 24 to produce a warning to the vehicle driver in accordance with an warning signal AL from controller 8 is installed in a front portion of a driver's seat when controller 8 detects the deviation of the vehicle from the traveling traffic lane. Warning device incorporates a speaker to produce a voice or buzzer sound thereinto. Next, a traffic lane deviation preventive control processing carried out by controller 8 will be described with reference to a flowchart of FIG. 2. This lane deviation preventive control process is executed by a timer interrupt processing, for example, for each of 10 milliseconds.

At a step S1 of FIG. 1, various kinds of data are read from each sensor, camera controller 14, and driving torque controller 12. Specifically, controller 8 reads longitudinal acceleration Xg, lateral acceleration Yg, yaw rate φ, respective road wheel velocities Vwj (j=FR, FL, RL, and RR), direction indication switch signal WS, master cylinder pressure Pm, steering angle θ, direction indicator switch signal WS detected by means of each sensor, drive torque Tw from driving torque controller 12, vehicular yaw angle Φ of camera controller 14 with respect to traveling traffic lane, lateral displacement X from the center of the traffic lane, and curvature ρ of the traveling traffic lane.

At the next step S2, controller 8 calculates a vehicular velocity V from an average value of front left and right road wheel velocities $VW_{FL}$ and $VW_{FR}$ which are non-driven wheels read at step S1.

$$V=(Vw_{FL}+Vw_{FR})/2 \quad (1).$$

At the next step S3, controller 8 calculates a future estimated lateral displacement, namely, deviation estimated value XS. Specifically, on the basis of vehicle yaw angle Φ read at step S1, lateral displacement X from the center of the traffic lane read at step S2, and curvature ρ of the traffic lane, and vehicle velocity V of the vehicle calculated at step S2, deviation estimated value Xs is calculated which is the future estimated lateral displacement in accordance with the following equation (2).

$$Xs=Tt\times V\times(\Phi+Tt\times V\times\beta)+X \quad (2).$$

In equation (3), Tt denotes a vehicular head time for calculating a forward gazing distance, and if head time Tt is multiplied with vehicular velocity V, the result is the forward gazing distance. As will be described later, in this embodiment, when an absolute value of future estimated lateral displacement Xs is equal to or larger than a predetermined lateral displacement limitation value Xc, controller 8 determines that the vehicle has a traffic lane deviation tendency. It is noted that when the vehicle is deviated toward the left direction, future estimated lateral displacement Xs provides the positive value.

Next, the routine goes to a step S4. At step S4, controller 8, determines if direction indicator switch 22 is turned on. If direction indicator switch 22 is turned on at step S4, the routine goes to a step S5. At step S5, controller 8 determines if a sign of direction indicator switch WS is made coincident with a sign of deviation estimated value Xs. If both signs are coincident with each other, controller 8 determines that the traffic lane change occurs and the routine goes to a step S6. At step S6, a traffic lane change flag $F_{LC}$ is set to "1" and the routine goes to a step S10. On the other hand, if signs of both are not coincident with each other (No) at step S5, the routine goes to a step S7 determining that no traffic lane change occurs. At step S7, lane change flag $F_{LC}$ is reset to "0" and the routine goes to step S10.

If direction indicator switch 22 is turned off at step S4 (No), the routine goes to a step S8. At step S8, controller 8 determines if a predetermined period of time (for example, 4 seconds) has passed. If the predetermined time is not passed at step S8, the routine goes to step S10. If the predetermined period of time has passed (Yes) at step S8, the routine goes to a step S9. At step S9, controller 8 resets traffic lane change flag $F_{LC}$ is reset to "0" and the routine goes to step S10. Even if direction indicator switch 22 is released with the operation of the driver during the traffic lane change, an operation of the deviation avoidance control during the traffic lane change can be prevented from occurring.

At step S10, controller 8 determines if traffic lane change flag $F_{LC}$ is set to "1". If $F_{LC}$=1 (Yes) at step S10, the routine goes to a step S11 determining that the vehicle is under the traffic lane change. At step S11, a warning flag $F_w$ is reset to "0" indicating that a deviation warning is being stopped and the routine goes to a step S17 which will be described later. If $F_{LC}$≠1 at step S10, the routine goes to a step S12. At step S12, controller 8 determines if an absolute value |Xs| of deviation estimated value Xs is equal to or larger than a warning determination threshold value Xw (=Xc−$X_M$) calculated by subtracting a margin (constant value) $X_M$ from a time at which the warning is operated to a time at which the deviation preventive control is operated from lateral displacement limitation value Xc. If |Xs|≧Xw (yes) at step S12, controller 8 determines that the vehicle is in a traffic lane deviation state and the routine goes to a step S13. At step S13, controller 8 determines if deviation estimated value Xs is positive or negative. If Xs>0 (Yes) at step S13, controller 8 determines that the vehicle has the tendency of deviation toward the left direction with respect to the traffic lane and the routine goes to a step S14. At step S14, controller 8 sets warning flag Fw to "1" and the routine goes to step S17. If Xs≦0 at step S13, the routine goes to a step S15. At step S15, controller 8 sets warning flag Fw to "−1" and the routine goes to step S17.

On the other hand, if |Xs|<Xw (No) at step S12, the routine goes to a step S16. At step S16, controller 8 determines if absolute value |Xs| of deviation estimated value Xs is smaller than a value of (Xw−$X_H$). (Xw−$X_H$) denotes a value of the subtraction of a hysteresis value $V_H$ to avoid a warning hunting from warning determination threshold value Xw. If |Xs|<Xw−$V_H$ (yes) at step S16, the routine goes to step S11. If |Xs|≧Xw−$X_H$ (No) at step S16, the routine goes directly to step S17. At step S17, controller 8 executes a target moment calculation processing shown in FIG. 3 to calculate a target yaw moment Mso required to avoid the deviation state of the vehicle. At a step S18, controller 8 executes a warning output processing shown in FIG. 5 so as to carry out a drive processing of the warning device on the basis of warning flag Fw. At the next step S19, controller 8 executes a target moment correction processing shown in FIG. 7 in which target yaw moment Mso calculated at step S17 is corrected and target yaw moment Ms after the correction is calculated. At the next step S20, controller 8 executes a braking torque control processing shown in FIG. 9 in which a braking control for each of front left and right and rear left and right road wheels is carried out on the basis of target yaw moment Ms corrected at step S19. Then, the timer interrupt processing is ended and the routine is returned to a predetermined main program.

Figure 3:
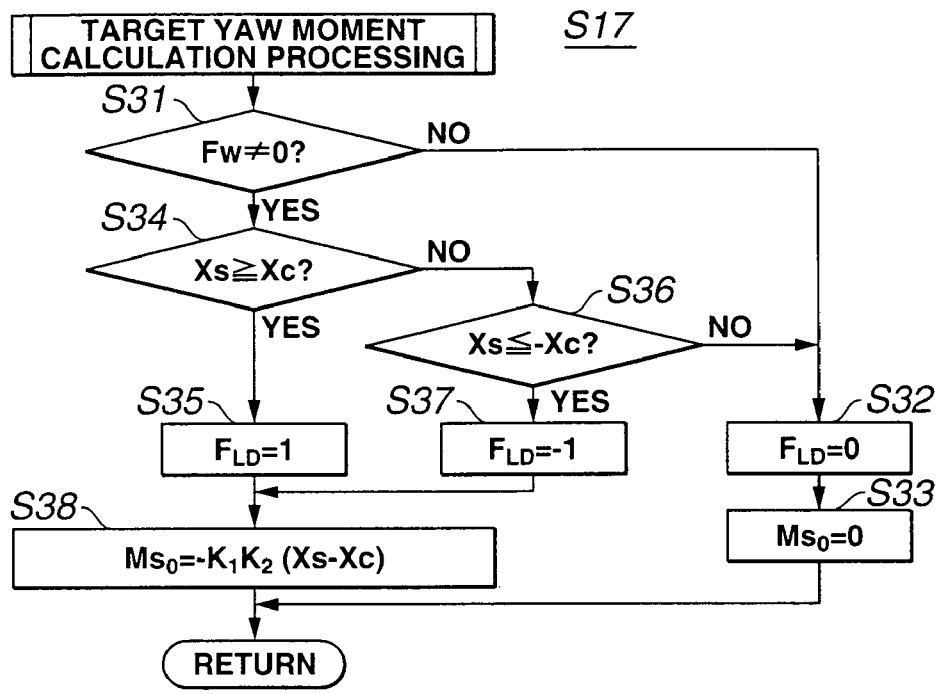
FIG. 3 is an operational flowchart representing a target yaw moment calculation processing in the traffic lane deviation prevention control process shown in FIG. 2.

FIG. 3 shows the target moment calculation processing at step S17. In details, at a step S31, controller 8 determines if warning flag Fw is reset to "0". If Fw=0 at step S31, controller 8 determines that the deviation warning is being stopped and the vehicle is not in the traffic lane deviation state and the routine goes to a step S32. At step S32, a deviation determination flag FLD is reset to "0" indicating that the vehicle has not the tendency of deviation and the routine goes to a step S33. At step S33, target yaw moment Mso is set to zero and the target moment calculation processing is ended. Then, the routine is ended at a predetermined main program. If Fw≠0, the routine goes to a step S34 determining that the deviation warning is carried out and the traffic lane deviation state occurs. At step S34, controller 8 determines if deviation estimated value Xs is equal to or larger than a preset lateral displacement limitation value Xc (in a domestic Japan, a traffic lane width of a express way is 3.35 meters and, therefore, for example, preset to about 0.8 meters). If Xs≧Xc at step S34, the routine goes to a step S35 at which $F_{LD}$ is set to "1". Then, the routine goes to a step S38.

On the other hand, if Xs<Xc, the routine goes to a step S36. At step S36, controller 8 determines whether deviation estimated value Xs is equal to or smaller than a negative value −Xc of the lateral displacement limitation value Xc. If Xs≦−Xc, controller 8 determines that the vehicle has the tendency of the rightward deviation and the routine goes to a step S37. At step S37, deviation determination flag $F_{LD}$ is set to "1" and the routine is transferred to step S38. If Xs>−Xc, controller 8 determines that the traffic lane deviation cannot be predicted and the routine goes to step S32. At step S38, controller 8 calculates target yaw moment Mso on the basis of the following equation (3), ends target moment calculating processing, and the routine is returned to the predetermined main program $$Mso = -K1 \times K2 \times (Xs - Xc) \quad (3).$$

Figure 4:
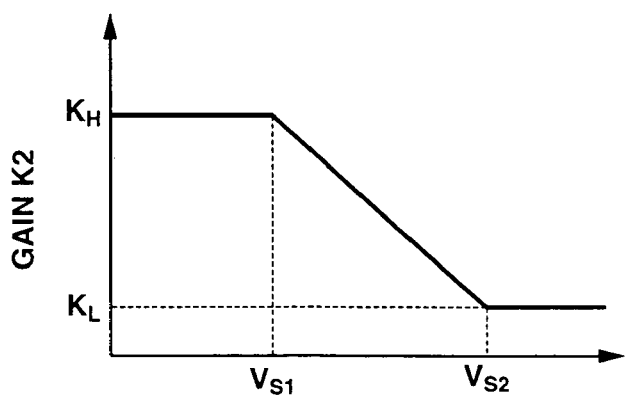
FIG. 4 is a calculation map representing a gain K2.

In equation (3), K1 denotes a constant determined according to vehicle specifications, K2 denotes a gain varied in accordance with the vehicular velocity and is calculated by referring to a gain calculation map shown in FIG. 4 on the basis of vehicular velocity V. This gain calculation map is set as follows: Gain K2 is fixed to a relatively large value $K_H$ during the vehicle speed from zero to a predetermined low speed Vs1, gain K2 is decreased in accordance with the increase in vehicle speed V during the vehicle speed V which exceeds predetermined value Vs1 to a predetermined high speed value Vs2, and gain K2 is set so as to fixed to a relatively small threshold value $K_L$ when vehicle speed V is in excess of a predetermined value Vs2.

Figure 5:
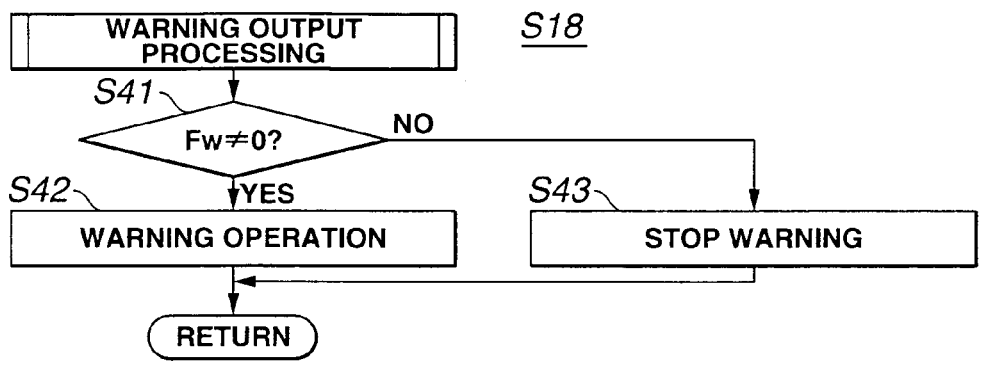
FIG. 5 is an operational flowchart representing an example of a warning output processing in the traffic lane deviation preventive control process shown in FIG. 2.
Figure 6:
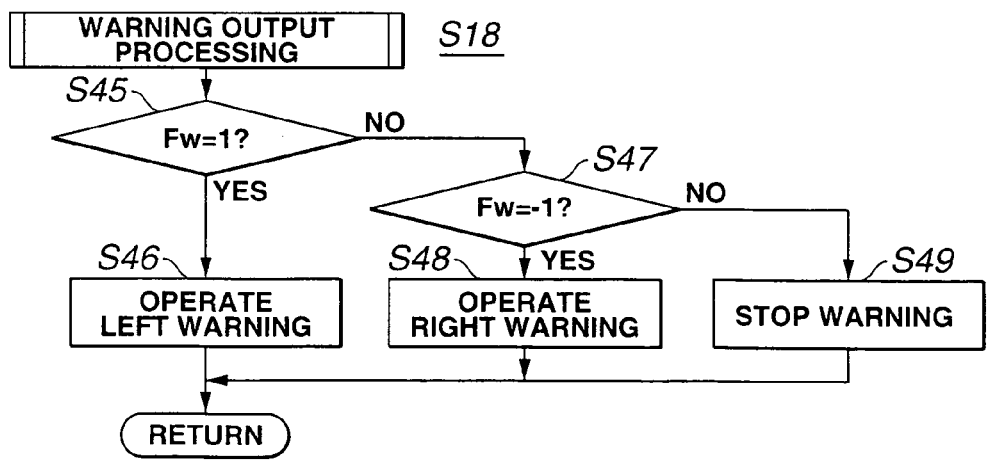
FIG. 6 is an operational flowchart representing another example of the warning output processing in the traffic lane deviation preventive control process shown in FIG. 2.

In addition, FIG. 5 shows the warning output processing of step S18. At a step S41, controller 8 determines whether warning flag Fw≠0. If Fw≠0 at step S42, controller 8 issues warning signal AL to warning device 24 at a step S42. Then, the driver receives the warning and the warning output processing is ended. Then, the routine is ended and is returned to the predetermined main program. If Fw=0 at step S41, the routine goes to a step S42 at which controller 8 stops the warning (end the output of warning signal WS). Then, the routine is ended and is returned to the predetermined main program. It is noted that at the warning output processing at step S18, a warning sound may be issued from a direction different in the left and right directions. That is to say, if the vehicle has the tendency of the deviation in the left direction, a left side warning is driven and if the vehicle has the tendency of the deviation in the right direction, a right side warning is driven. In this alternative case, as shown in FIG. 6, at step S45, controller 8 determines if warning flag Fw is set to "1". If Fw=1, controller 8 determines that the vehicle has the tendency to deviate toward the left direction and the routine goes to a step S46 at which controller 8 issues warning signal $AL_L$ to warning device 24 to warn that the vehicle is deviated toward the left direction and the waning output processing is ended. Then, the routine is returned to the predetermined maim program. On the other hand, if Fw≠1, the routine goes to a step S49. At step S49, left and right warning signals outputs are halted. Upon stop of the warning, the warning output processing is ended and the routine is returned to the predetermined main program.

Figure 7:
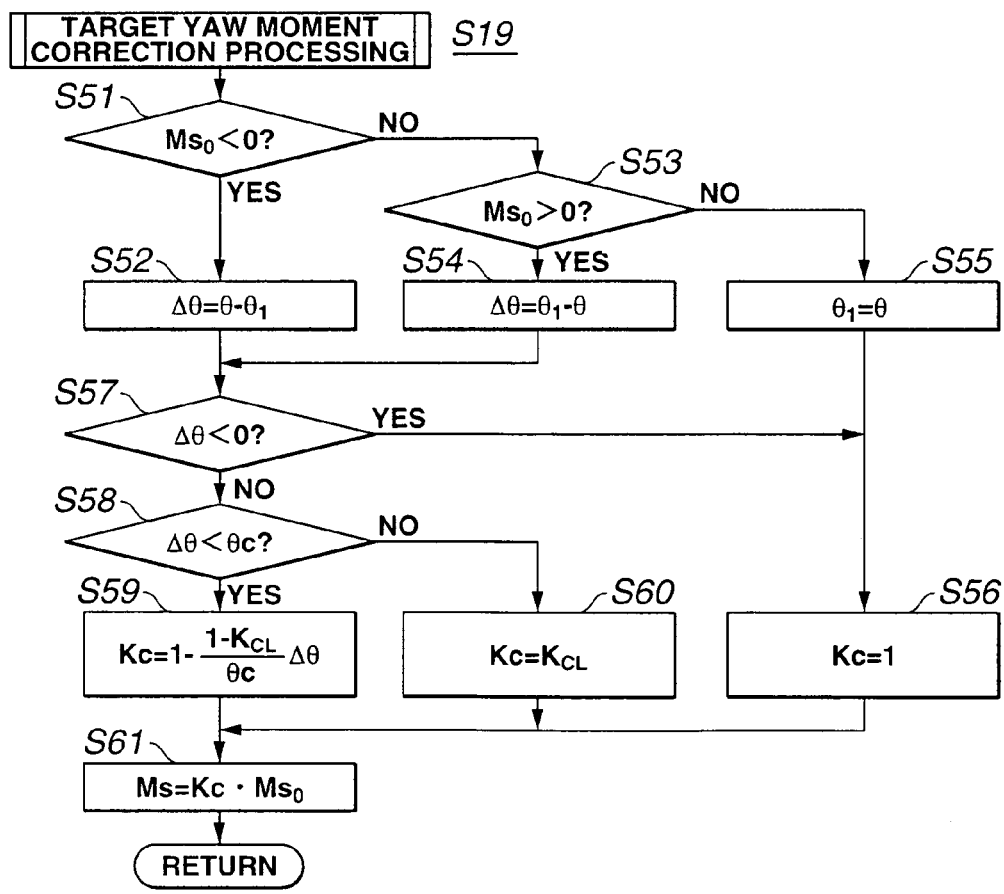
FIG. 7 is an operational flowchart representing a target moment correction processing in the traffic lane deviation preventive control process shown in FIG. 2.

Next, in the target moment correction processing at step S19, at a step S51 as shown in FIG. 7, controller 8 determines if target yaw moment Mso calculated at step S17 is not negative or not. If Mso<0, the routine goes to a step S52. At step S52, controller 8 calculates a deviation of Δθ between present steering angle θ and steering angle $θ_1$ before the deviation avoidance control on the basis of the following equation (4) and the routine goes to a step S57.

$$Δθ = θ - θ_1 \quad (4).$$

If Mso≧0 at step S51, the routine goes to a step S53 to determine if Mso>0. If Mso>0 at step S53, the routine goes to a step S54. If Mso=0 at step S53, the routine goes to a step S55. At step S55, controller 8 sets present steering angle θ to steering angle $θ_1$ before the deviation avoidance control in accordance with an equation (6). If Mso>0 at step S53, the routine goes to a step S54 in which deviation Δθ is calculated as follows:

$$Δθ = θ_1 - θ \quad (5).$$

$$θ_1 = θ \quad (6).$$

At step S56, controller 8 sets a target moment correction gain Kc to correct target yaw moment Kc to "1" (Kc=1) and the routine goes to a step S61. At step S57, controller 8 determines if deviation Δθ is negative. If Δθ<0 at step S57, controller 8 determines that the driver operated steering wheel in the same direction as the deviation avoidance estimated value Xs and the routine goes to step S56 in which target moment correction gain Kc is set to "1" (Kc=1). If Δθ≧0 (No) at step S57, the routine goes to a step S58 since controller 8 determines that the steering wheel is operated in the same direction as the deviation direction and both of deviation estimated value Xs and target yaw moment Mso are naturally increased and determines that target yaw moment correction gain Kc is set to be a value smaller than one (1) with a lower limit value as $K_{CL}$ and target yaw moment Mso is decreased and corrected. At step S58, controller 8 determines if deviation Δθ is smaller than a predetermined value θC. If Δθ<θc, the routine goes to a step S59. At step S59, controller 8 calculates target moment correction gain Kc using the following equation (7) and the routine goes to a step S61.

$$Kc = 1 - \{(1 - K_{CL})/θc\}Δθ \quad (7).$$

In equation (7), $K_{CL}$ denotes a lower limit value of target moment correction gain Kc and $0 ≦ K_{CL} < 1$.

If Δθ≧θc (No) at step S58, the routine goes to a step S60. At step S60, controller 8 sets target moment correction gain Kc to lower limit value $K_{CL}$ on the basis of the following equation (8).

$$Kc = K_{CL} \quad (8).$$

As described above, target moment correction gain Kc is calculated in accordance with deviation of Δθ between present steering angle θ and steering angle $θ_1$ before the deviation avoidance control. That is to say, Kc=1 when Δθ<0, Kc=$K_{CL}$ when Δθ>θc, and Kc is gradually reduced from 1 to KCL as Δθ becomes larger in a case where 0≦Δθ<θc.

At step S61, target yaw moment Ms after the correction is calculated by multiplying target yaw moment correction gain Kc calculated at step S56, S59, or S60 with target yaw moment Mso calculated at step S17. Thus, after target yaw moment Ms after the correction is calculated, target moment correction processing is ended, and the routine is returned to the predetermined main program.

$$Ms = Kc \times Mso \qquad (9).$$

In addition, in the driving torque control processing at step S20, controller 8 determines whether deviation determination flag $F_{LD}$ is reset to "0" at step S71. If $F_{LD}=0$, the routine goes to a step S72. At step S72, controller 8 sets front left road wheel target liquid pressure $P_{SFL}$ and front right road wheel target liquid pressure $P_{SFR}$ to master cylinder liquid pressure Pm as shown in equation (10) and sets rear left road wheel target liquid pressure $P_{SRL}$ and rear right road wheel target liquid pressure $P_{SRR}$ to a rear road wheel master cylinder pressure Pmr with the front-and-rear distribution calculated from master cylinder pressure Pm taken into consideration. Then, the routine goes to a step S79 as will be described later.

$$P_{SFL} = P_{SFR} = Pm \qquad (10).$$

$$P_{SRL} = P_{SRR} = Pmr \qquad (11).$$

In addition, if $F_{LD} \neq 0$ at step S71, the routine goes to a step S73. At step S73, controller 8 determines whether an absolute value |Ms| of target yaw moment is smaller than a set value Ms1. If |Ms|<Ms1 at step S73, the routine goes to a step S74. At step S74, controller 8 sets front road wheel side target braking liquid pressure difference to zero as shown in equation (12) and calculates a rear road wheel side target braking liquid pressure difference ΔPSR on the basis of the following equation (13) so that the difference is developed only the braking forces between rear left and right road wheels and the routine goes to a step S76.

$$\Delta P_{SF} = 0 \qquad (12).$$

$$\Delta P_{SR} = 2 \cdot K_{BR} \cdot |MS|/T \qquad (13).$$

On the other hand, if determination result of step S73 is |Ms1|≧Ms1, the routine goes to a step S75. At step S75, controller 8 calculates front road wheel side target braking liquid pressure difference ΔPSF on the basis of the following equation (14) and calculates rear road wheel side target braking liquid pressure difference ΔPSR on the basis of the following equation (15) so as to set the difference between each braking force of road wheels to develop the difference and the routine goes to a step S76.

$$\Delta P_{SF} = 2 \cdot K_{BF} \cdot (|MS| - Ms1)/T \qquad (14).$$

$$\Delta P_{SR} = 2 \cdot K_{BR} \cdot Ms1/T \qquad (15).$$

In equations (14) and (15), T denotes a tread which is identical to front and rear road wheels and KBF and KBR denote conversion coefficients to convert the braking force into braking liquid pressure, and is defined as brake specifications. It is noted that, at step S43, $\Delta P_{SF}=2 \cdot KBF \cdot |MS|/T$ may be set so as to develop the braking force difference only at the front road wheel side.

At step S76, controller 8 determines whether target yaw moment Ms is tried to develop in the negative direction, namely, in the leftward direction. If Ms<0, the routine goes to a step S77. At step S77, controller 8 sets front left road wheel target braking pressure PSFL to master cylinder pressure Pm as expressed in the following equation (16), sets front right road wheel braking pressure PSFR to master cylinder pressure Pm plus target braking liquid pressure difference ΔPSF as shown in the following equation (17), sets rear left road wheel target braking pressure $P_{SRL}$ to a rear road wheel side master cylinder pressure Pmr as expressed in the following equation (18), and sets rear right road wheel target braking liquid pressure $P_{SRR}$ to rear road wheel side master cylinder pressure Pmr plus rear road wheel side target braking liquid pressure difference $\Delta P_{SR}$ as expressed in the following equation (19) and the routine goes to a step S79.

$$P_{SFL} = Pm \qquad (16),$$

$$P_{SFR} = Pm * \Delta P_{SF} \qquad (17),$$

$$P_{SRL} = Pmr \qquad (18),$$

and $$P_{SRR} = Pmr + \Delta P_{SR} \qquad (19).$$

On the other hand, if Ms≧0 at step S76, the routine goes to a step S78. At step S78, controller 8 sets front left road wheel target braking pressure $P_{SFL}$ to master cylinder pressure Pm plus front road wheel side target braking liquid pressure difference $\Delta P_{SF}$ as expressed in the following equation (20), sets front right road wheel target braking pressure PSRR to master cylinder pressure Pm as expressed in the following equation (21), sets rear left road wheel target braking pressure PSRL to rear road wheel side master pressure cylinder pressure Pmr plus rear road wheel side target braking liquid pressure difference $\Delta P_{SR}$ as expressed in the following equation (22), and sets rear right road wheel side target braking pressure $P_{SRR}$ to rear road wheel side master cylinder pressure Pmr as expressed in the following equation (23) and the routine goes to a step S79.

$$P_{SFL} = Pm + \Delta P_{SF} \qquad (20).$$

$$P_{SFR} = Pm \qquad (21).$$

$$P_{SRL} = Pmr + \Delta P_{SR} \qquad (22).$$

$$P_{SRR} = Pmr \qquad (23).$$

At the next step S79, controller 8 determines whether deviation determination flag $F_{LD}$ is not "0". If FLD≠0 at step S79, the routine goes to a step S80 determining that an engine output is throttled so as to disable acceleration even if the accelerator manipulation occurs. At step S80. controller 8 calculates target drive torque Trq in accordance with the following equation (24) and the routine goes to step S82.

$$Trq = f(A) - g(Ps) \qquad (24).$$

In equation (24), Ps is a sum of target braking liquid pressure differences $\Delta P_{SF}$ and $\Delta P_{SR}$ developed according to the deviation avoidance control ($Ps = \Delta P_{SF} + \Delta P_{SR}$). In addition, f(A) is a function to calculate a target drive torque in accordance with the accelerator function and, in equation (24), g(Ps) denotes a function to calculate the braking torque predicted to be developed due to the braking liquid pressure.

In addition, if $F_{LD}=0$ at step S79, controller 8 determines that the engine output is carried out in accordance with the accelerator manipulation by the vehicle driver and the routine goes to a step S81. At step S81, controller 8 calculates a target drive torque Trq in accordance with the following equation (25) and the routine goes to a step S82.

$$Trq = f(Acc) \qquad (25).$$

At step S82, controller 8 outputs target braking pressures $P_{SFL}$, $P_{SFR}$, $P_{SRL}$, and $P_{SRR}$ to braking fluid control circuit 7 (calculated at steps S72, S77, and S78) and target drive torque Trq calculated at step S80 or step S81 to driving torque controller 12 and the timer interrupt processing is ended to return to the predetermined main program. The processes at step S3 shown in FIG. 2, steps S32, S34 through S37 constitute deviation determining means (section), the process shown in FIG. 5 corresponds to warning means (a warning section), and the process shown in FIG. 7 corresponds to the deviation avoidance controlled variable limiting means (section). Hence, suppose now that the vehicle is traveling in a straight line along a traveling traffic lane. In this case, in the traffic lane deviation prevention control procedure shown in FIG. 2, at step S3, deviation estimated value Xs which gives −Xc<Xs<Xc is calculated. Since the vehicle is traveling in straight run, at step S9, traffic lane change flag $F_{LC}$ is reset to "0" to indicate that no traffic lane change occurs. Deviation estimated value Xsis smaller than warning determination threshold value Xw, smaller than Xw−$X_H$. Hence, determination at step S12, the routine goes to step S16 and at step S11 warning flag Fw is reset to "0" representing that the warning is not operated. Thus, at step S32 from step S31 shown in FIG. 3, deviation determination flag $F_{LD}$ is set to 0 indicating that the vehicle has not tendency of the deviation. At step S72, target braking pressures $P_{SFL}$ through $P_{SRR}$ of respective road wheels 5FL through 5RR are set to master cylinder pressures Pm and Pmr in accordance with the driver's braking operation, respectively, so that the vehicle is traveling in a travel state in accordance with the driver's steering operation.

Suppose that the vehicle is started to be deviated gradually in the leftward direction from the center of the traveling traffic lane due to a look aside of the vehicle driver in a state where the steering operation is not in0volved. In this case, if deviation estimated value Xs is equal to or larger than warning determination threshold value Xw, the determination of step S12 causes step S13 to be passed. At step S14, warning flag Fw is set to "1" to inform the driver of the deviation warning. Furthermore, when deviation estimated value Xs is equal to or larger than lateral displacement limit value Xc, at step S35 in FIG. 3, deviation determination flag $F_{LD}$=1, namely, the vehicle has the state in which the deviation tendency is present toward the left direction. At step S38, controller 8 calculates target yaw moment Mso in the direction to avoid the deviation on the basis of the equation (3). Since the driver does not perform the handle operation (steering operation), deviation Δθ between present steering angle θ and steering angle $θ_1$ before deviation avoidance control is zero. On the basis of equation (7) at step S59 in FIG. 7, target yaw moment correction gain Kc is calculated as "1". Thus, at step S61, target yaw moment Mso is directly calculated as target yaw moment Ms. To generate this target yaw moment Ms, at step S77 in FIG. 9, right road wheel side target braking fluid pressures $P_{SFR}$ and $P_{SRR}$ are set to be large so that an accurate traveling course correction toward the rightward direction is carried out.

Suppose that the vehicle is traveling on a straight road and, at a time point t0 in FIGS. 10A through 10D, the vehicle driver steers the steering wheel in a left revolution direction without operation of direction indicator switch 22 to make the traffic lane change. In this case, steering wheel θ is increased at time point to. Along with the increase in the steering wheel θ, deviation estimated value Xs from the traffic lane of the vehicle is increased in the positive value (leftward) direction. Then, until Xs≧Xc, the traveling state in accordance with the steering operation by the driver is continued without operation of the deviation avoidance control.

Then, at a time point of t1 in FIGS. 10A through 10D, deviation estimated value Xs provides lateral displacement limitation value Xc. Since the driver does not operate direction indicator switch 22 for a time equal to or longer than a predetermined time, according to the determination at step S4 in FIG. 2, the routine goes to step S8 and step S9 in which traffic lane change flag $F_{LC}$ is reset to "0". Since |Xs|=Xc, |Xs|≧Xw is established and at step S14 warning flag $F_{LD}$ is set to "1" indicating that the warning is activated. In addition, since Xs=Xc, according to the determination at step S34 in FIG. 3, the routine is transferred to step S35 and deviation determination flag $F_{LD}$ is set to "1" indicating that the vehicle has the tendency to be deviated toward the leftward direction. At step S38, target yaw moment Mso in the deviation avoidance direction is calculated as "0" under the equation (3). Thus, at step S55 of FIG. 7, steering angle θ at time point t1 is set as steering angle $θ_1$ before deviation avoidance control.

Figure 9:
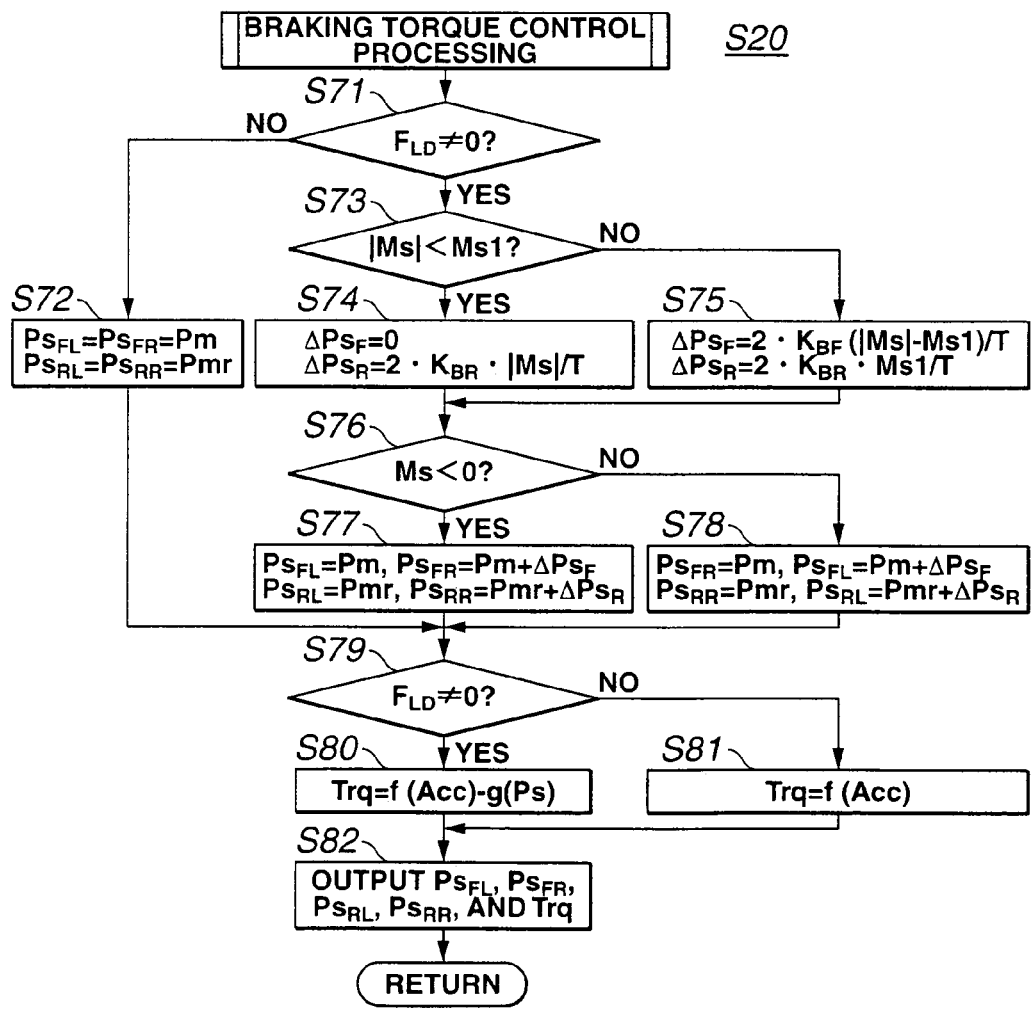
FIG. 9 is an operational flowchart representing a braking torque control process in the traffic lane deviation preventive control shown in FIG. 2.
Figure 10A:
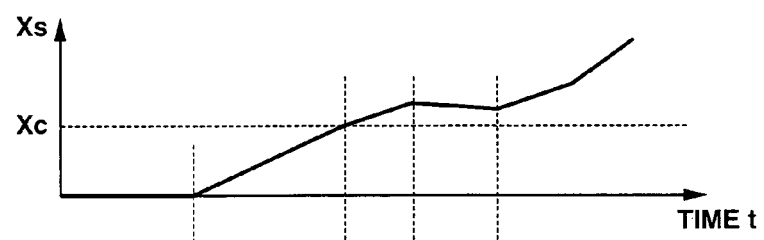
FIGS. 10A, 10B, 10C, and 10D are integrally a timing chart for explaining an operation of the lane keep control apparatus in the first embodiment shown in FIG. 1.
Figure 10B:
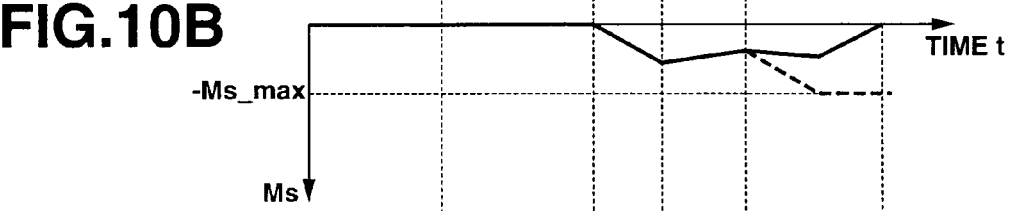
Figure 10C:
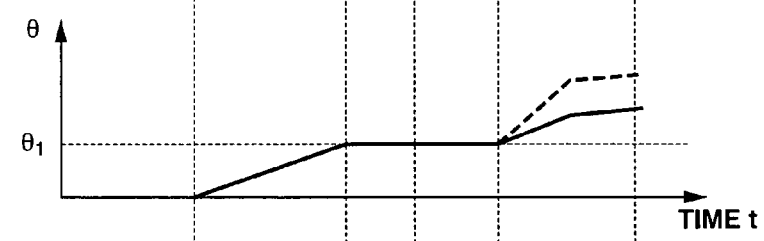
Figure 10D:
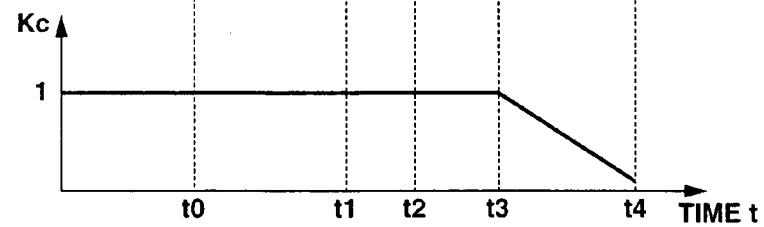

Thereafter, as denoted by FIG. 10C, in a state in which steering angle θ maintained constant, the traffic lane change is continued. In this case, at a time point of t2, Xs≧Xc. At step S38 in FIG. 3, target yaw moment Mso in accordance with deviation estimated value Xs is calculated as a negative value. Since θ=$θ_1$, deviation Δθ at step S52 in FIG. 7 is set to be 0 (Δθ=0). According to the determination at step S57, the routine goes to step S58 and step S59 in which the target yaw moment correction gain Kc is set to "1" on the basis of equation (7). Hence, target moment correction gain Kc is calculated to be 1 on the basis of equation (7). Hence, target yaw moment Mso calculated at step S38 is calculated directly as target yaw moment Ms. In order to develop this target yaw moment, right road wheel side target braking fluid pressures $P_{SFR}$ and $P_{SRR}$ at step S77 of FIG. 9 are set to be large so that the deviation avoidance control in the rightward direction is carried out.

Thereafter, at a time point t3, the driver further carries out the steering operation so that steering angle θ is increased more. In this case, θ≧$θ_1$. If θ<$θ_1$+θc, according to the determination at step S57 in FIG. 7, the routine goes to step S59 via step S58. At step S59, target moment correction gain Kc in accordance with deviation Δθ is calculated to be smaller than 1. Hence, at step S61, target yaw moment Ms after the correction at step S61 is smaller than target yaw moment Mso. Hence, controlled variable of the deviation avoidance control toward the right direction which is the deviation avoidance direction is limited.

Suppose that target moment correction processing shown in FIG. 7 is not carried out. In this case, right road wheel side braking fluid pressures $P_{SFR}$ and $P_{SRR}$ are set to be large to develop target yaw moment Mso calculated at step S38 and the deviation avoidance control toward the rightward direction is carried out. As denoted by a broken line shown in FIG. 10B, target yaw moment Mso is calculated in such a way that its absolute value becomes large in accordance with the increase in deviation estimated value Xs increased along with the driver's steering operation of the driver. Therefore, as denoted by the broken line shown in FIG. 10C, a large steering operation more than necessity is carried out in order to reach to a traveling trajectory of the driver's target. At this time, the driver feels that, even if the large steering operation is carried out, it is difficult to reach to the traveling trajectory which is the target and feels unpleasantly. Furthermore, as step S20 shown in FIG. 2, in a case where such a yaw moment that the control of the braking torque for front and rear left and right road wheels is carried out to avoid the deviation is developed, the braking torque of either left or right road wheels becomes larger. Consequently, the traveling speed of the vehicle becomes reduced largely and the driver gives the unpleasant feeling.

Hence, target yaw moment correction processing shown in FIG. 7 is carried out. Thus, in a case where the steering operation direction is the same as the deviation direction in a case where the driver operates the steering wheel before and after the deviation avoidance control, the controlled variable of deviation avoidance control can be limited. Hence, in a case where the vehicle carries out the traffic lane change with the steering operation not along with the operation of the direction indicator, the unpleasant feeling to the driver can be reduced.

That is to say, in a case where the deviation avoidance control is started in which deviation estimated value Xs is equal to or larger than lateral displacement limit value Xc and the driver furthermore steers the steering wheel in the deviation direction in a state in which the deviation speed toward an outside of the traveling traffic lane due to the effect of the deviation avoidance control, it is difficult to think that the driver unconsciously operates the steering wheel but the intention of the driver can assuredly be determined to carry out the steering operation. Hence, the limitation of the controlled variable of the deviation avoidance control causes an effective reduction in the driver's unpleasant feeling.

Furthermore, if the steering angle is detected to have the increase tendency from a time at which the deviation avoidance control start, it is more clearly understandable that the driver tries to operate the vehicle in the deviation direction of the traffic lane. Hence, only in a case where the steering angle from the time at which the deviation avoidance control is started is increased, the correction processing such as to limit the target yaw moment is carried out so that the driver can easily intervene the steering.

In addition, unless the furthermore increase in the steering in the vehicular deviation direction, the controlled variable of the deviation avoidance control is not limited and a safe deviation avoidance control can be carried out without unwilling limitation on the controlled variable. As described above, in the first embodiment, the steering angles before and after the start of the deviation avoidance control are detected and the controlled variable of the deviation avoidance control on the basis of the deviation between the steering angle before the deviation avoidance control and the steering angle after the deviation avoidance control. Hence, the controlled variable of the deviation avoidance control can be limited only in a case where the vehicle driver assuredly intervenes the steering. The deviation avoidance control is limited in accordance with the steering intervention on the basis of the deviation of the steering angle. Hence, a speedily reduction in the unpleasant feeling of the driver along with the steering wheel manipulated variable.

In addition, in a case where the deviation between the steering angle before the deviation avoidance control and the steering angle after the deviation avoidance control is increased in the same direction as the vehicular deviation direction, namely, in a case where the driver increases the steering angle of the steering wheel in the deviation direction after the deviation avoidance control start, the controlled variable of the deviation avoidance control is limited. Hence, the controlled variable of the deviation avoidance control for the driver to intervene the steering in the direction that the driver has a strong unpleasant feeling can be limited. In a case where the driver does not intentionally intervene the steering, a safety deviation avoidance can be carried out without reduction in the effect of the deviation avoidance control.

Figure 8:
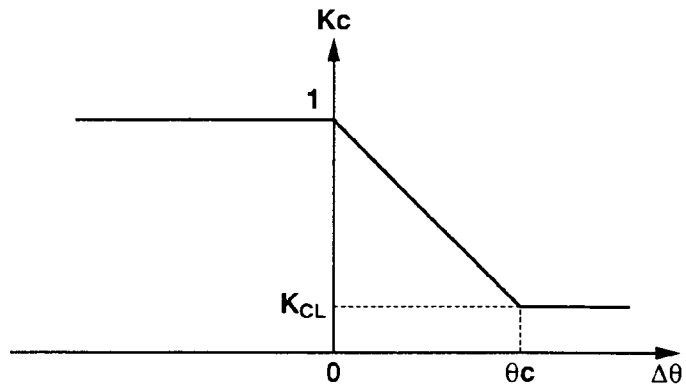
FIG. 8 is an explanatory view for explaining a target yaw moment correction gain Kc.

In the first embodiment, as shown in FIG. 8, target yaw moment correction gain Kc is calculated so as to become linearly decreased from 1 to lower limit value $K_{CL}$ when deviation $\Delta\theta$ of the steering angle is increased from 0 to predetermined value $\theta C$ using equation (7). The present invention is not limited to this. Such a function as to monotonously decrease together with the increase in the deviation of steering angle $\Delta\theta$ may be applied to this correction gain Kc. In addition, lower limit value $K_{CL}$ may be zero. In this case, in a case where after the control start the steering angle $\theta$ is operated through an angle equal to or larger than predetermined value $\theta c$, target yaw moment due to the deviation avoidance control can be limited to zero. Hence, for the driver, the steering becomes easier to be operated. Furthermore, in the first embodiment, the correction processing of the deviation avoidance control is carried out using target moment correction gain Kc shown in FIG. 8. The present invention is not limited to this. If deviation $\Delta\theta$ of the steering angle is equal to or larger than the predetermined value, such a correction processing that the controlled variable is gradually limited along with the elapse of time may be carried out.

(Second Embodiment)

Next, a second preferred embodiment of the lane keep control apparatus according to the present invention will be described below. In this embodiment, controller determines the turning state of the vehicle, calculates an offset steering angle as an ideal steering angle, and limits the controlled variable of the deviation avoidance control on the basis of the deviation between the offset steering angle and the steering angle before and after the deviation avoidance control.

Figure 11:
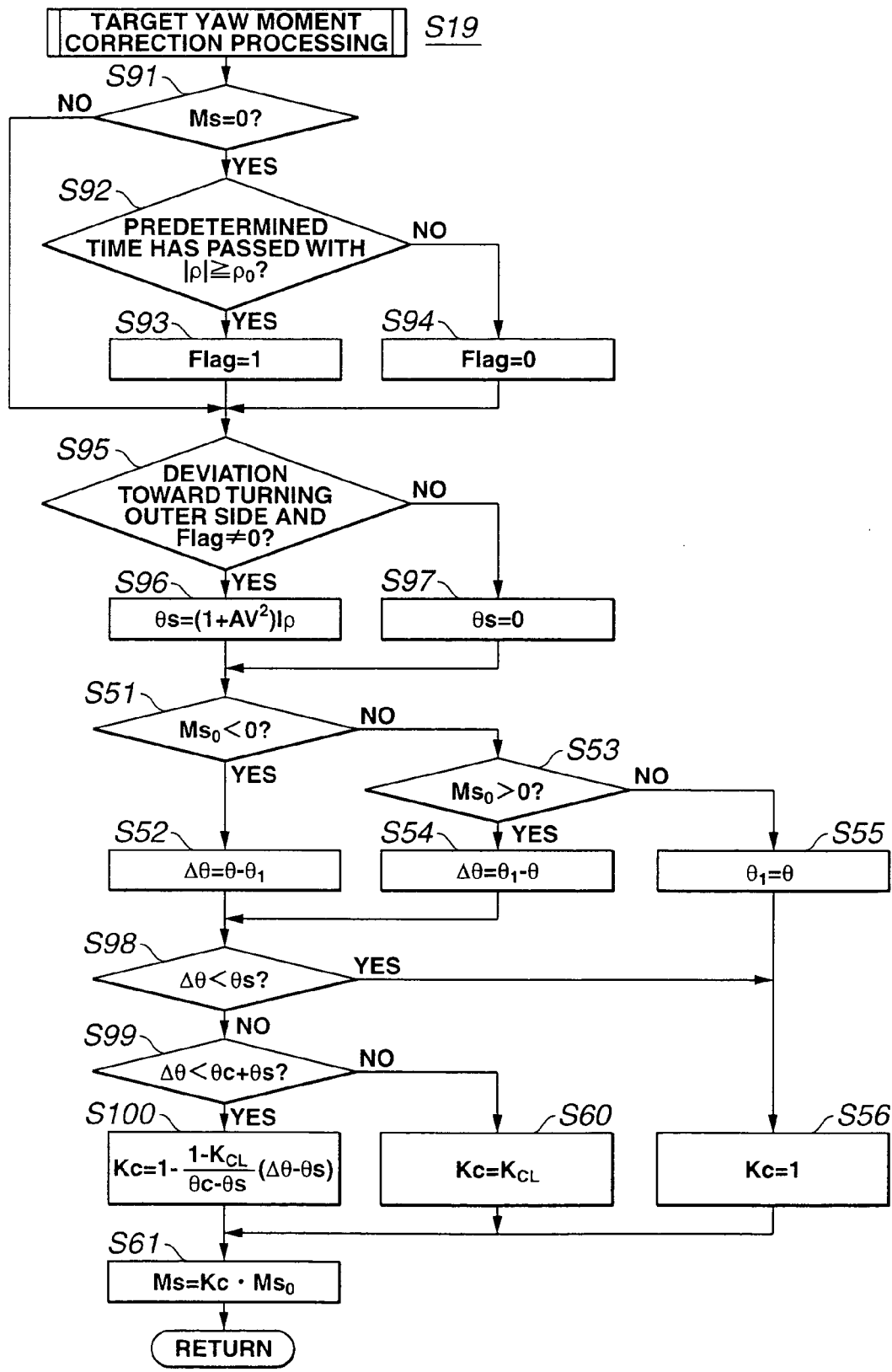
FIG. 11 is an operational flowchart representing a target yaw moment correction processing in the traffic lane deviation preventive control executed in the lane keep control apparatus in a second preferred embodiment according to the present invention.

FIG. 11 shows an operational flowchart representing a target moment correction processing executed by controller 8 in the second embodiment. As compared with the target moment correction processing shown in FIG. 7 in the first embodiment, steps S91 through S97 to calculate offset steering angle $\theta s$ which accords with the steering state when determining the turning state of the vehicle are added, the process at step S57 is replaced with a step S98 in which controller 8 determines whether the deviation $\Delta\theta$ of the steering wheel is smaller than offset steering angle $\theta s$, the process at step S58 is replaced with a step S99 in which deviation $\Delta\theta$ is smaller than a sum ($\theta c+\theta s$) of predetermined value $\theta c$ and offset steering angle $\theta s$, and the process at step S59 is replaced with a step S100 in which target moment correction gain Kc is calculated on the basis of offset steering angle $\theta s$ and deviation $\Delta\theta$. Except these steps, the same processing as shown in FIG. 7 is executed. Hence, the corresponding portions in FIG. 11 to FIG. 7 are designated with the same signs and the detailed description will be omitted.

At a step S91, controller 8 determines whether target moment Mso is "0" or not. If Mso≠0, the routine goes to a step S95. If Mso=0, the routine goes to a step S92. At step S92, controller 8 determines whether a state in which an absolute value of curvature $\rho$ of traveling traffic lane is equal to or larger than a predetermined value $\rho_0$ is continued for a time duration equal to or longer than a predetermined time. It is noted that predetermined value $\rho_0$ is set to a curvature having a degree such that a self aligning torque acted upon the vehicle itself during the turning causes the tendency of the steering wheel to return to an outside of a curve if a force from the steering wheel is loosened.

If the predetermined time has passed at step S92, controller 8 determines that the vehicle is steadily turned state and the routine goes to a step S93. At step S93, controller 8 sets a turning determination flag Flag to "1" indicating that the vehicle is being turned and the routine goes to step S95 as will be described later. If the predetermined time has not elapsed (No) at step S92, controller 8 determines that the vehicle is traveling on the straight road and the routine goes to a step S94. At step S94, turning determination flag Flag is reset to "0" and the routine goes to step S95. At step S85, controller 8 determines if turning determination flag is set to "1" and the vehicle has the tendency of deviating toward an outside of the curve (curved road). If Flag=1 and deviation state in which the vehicle is tended to be deviated toward the outside of the curve (Yes) at step S95, the routine goes to a step S96. At step S96, controller 8 calculates offset steering angle θs used in the calculation of target yaw moment correction gain Kc.

This offset steering angle θs may be calculated to derive the ideal steering angle prescribed in accordance with the curvature of the traffic lane in travel and is calculated on the basis of the vehicle speed V, curvature ρ, wheel base l, and a stability factor A on the basis of the following equation (26).

$$\theta s = (1 + AV^2) \times 1 \times |\rho| \qquad (26).$$

It is noted that a magnitude of offset steering angle θs is equivalent to the steering angle required during the steady state turning. Even when the drive loosens the force applied to the steering wheel during the turning, the steering wheel is not returned at an angle equal to or larger than offset steering angle θs irrespective of the intention of the driver.

In addition, if, at step S95, Flag=0 or in a deviation state toward an inner side of the turning (No), the routine goes to a step S97. At step S97, controller 8 sets offset steering angle θs to zero on the basis of the following equation (27).

$$\theta s = 0 \qquad (27).$$

Then, at steps S51 through S55, deviation Δθ of steering angle before and after the deviation avoidance control is calculated. At a step S98, controller 20 determines whether deviation Δθ is smaller than offset steering angle θs calculated at step S96 or step S97. If Δθ<θs, the routine goes to step S56. At step S56, controller 8 sets the target moment correction gain Kc to "1" and the routine goes to step S61. In addition, if Δθ≧θs at step S98, the routine goes to a step S99. At step S99, controller 8 determines whether deviation Δθ is smaller than a sum of predetermined value θc and offset steering angle θs (θc+θs). If Δθ<θc+θs, the routine goes to a step S100. On the basis of the following equation (28), controller 8 calculates target moment correction gain Kc and the routine goes to a step S61.

$$Kc = 1 - \{(1 - K_{CL})/(\theta c - \theta s)\}(\Delta\theta - \theta s) \qquad (28).$$

Figure 12A:
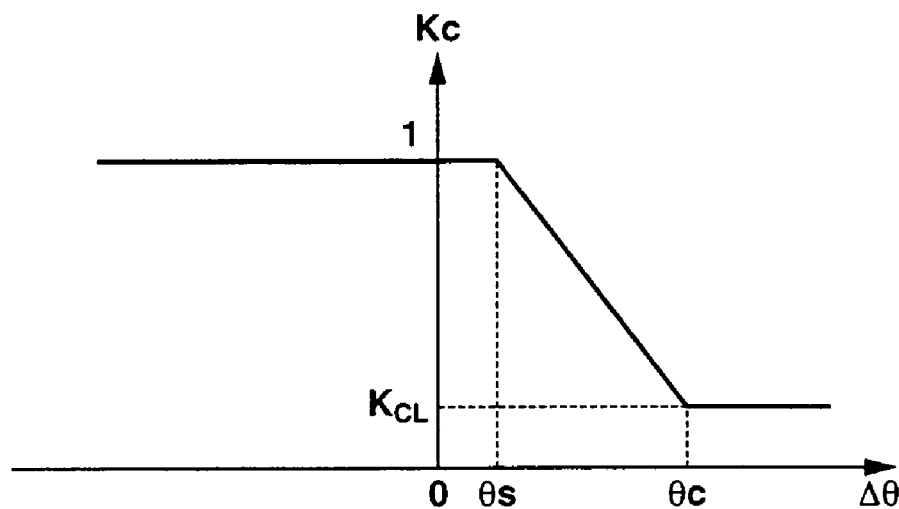
FIGS. 12A and 12B are explanatory views for explaining target yaw moment correction gains in the second embodiment shown in FIG. 11.

On the other hand, if Δθ≧θc+θs, the routine goes to a step S60 at which controller 8 sets target moment correction gain Kc to lower limit value $K_{CL}$. In this way, target moment correction gain Kc is fixed to $K_{CL}$ if Δθ≧θC, to Kc=1 if Δθ<θs, and is gradually reduced from 1 to $K_{CL}$ as deviation Δθ becomes larger if θs≦Δθ<θc as shown in FIG. 12A, In addition, if the vehicle is not in the turning state or the vehicle has the tendency to deviate toward the inner side of the turning, controller 8 sets Kc=1 if Δθ<0, Kc=KCL if Δθ≧θc, and sets KC such as to be gradually decreased from 1 to $K_{CL}$ as Δθ becomes large if 0≦Δθ<θc.

The processes of steps S92 through S97 correspond to ideal steering angle calculating means. Hence, suppose that, when the vehicle has the tendency of deviating toward an outer side of the curve during the vehicular travel on the curved road and the deviation avoidance control to correct the driving course toward an inner side of the curve is operated, the driver unconsciously loosens a force to operate the steering wheel. In this case, due to an action of a self aligning torque, the steering angle is naturally returned so that the vehicle deviates furthermore toward the outer side of the curved road. In the target moment correction processing shown in FIG. 11, controller 8 determines at step S95 that Flag=1 and the vehicle has the tendency of deviating toward outer side of the turning. Hence, the routine goes to step S96 at which controller 8 calculates offset steering angle θs which is the ideal steering angle required to turn the curve during the traveling on the basis of equation (26). Since the driver's intentional steering is not carried out, deviation Δθ of the steering angle before and after the deviation avoidance control becomes smaller than offset steering angle θs. Then, the routine goes from step S98 to step S56 at which Kc is set as follows: Kc=1 and the deviation avoidance control without limitation on target yaw moment Mso is continued.

Suppose that the deviation tendency is present on the outer side of the curved road. In a case where the force to operate the steering wheel by the driver is loosened and without consideration of the ideal steering the correction processing of target yaw moment is executed. In this case, the driver is determined to operate the steering wheel in the same direction as the deviation direction and the controlled variable of the deviation avoidance control is limited. Hence, the vehicle becomes easy to be deviated from the traveling traffic lane and the effect of the deviation avoidance control might largely be damaged. Hence, target moment correction processing shown in FIG. 11 is executed so that the vehicle is in the deviation state toward the outer side of the turning. At this time, controller 8 calculates the ideal steering angle required to turn the curve during the traveling in accordance with the curvature of the traffic lane and determines that the steering operation to the deviation direction is not carried out by the driver if the steering angle is varied in the deviation direction more than the ideal steering angle and controller 8 does not limit the target yaw moment. Hence, the fact that the target yaw moment is unintentionally limited so that the vehicle is easy to be deviated can extremely be suppressed. In addition, in a case where the steering wheel more than the ideal steering wheel is varied in the deviation direction, controller 8 determines that the driver intentionally operates the steering wheel toward the deviation direction, the target yaw moment is limited. Hence, the steering intervention without unpleasant feeling given to the driver can be carried out.

Suppose that the vehicle has the deviation tendency toward the inner side of the curved road during the run on the curved road. In this case, at step S97, offset steering angle θs is set to "0". When the deviation avoidance control to correct the travel course toward the outer side of the curved road is operated, the driver unconsciously loosens the force to operate the steering wheel. In this case, the steering angle is returned naturally due to the action of the self aligning torque. Hence, the course correction in the same direction as the deviation avoidance control is naturally carried out. The deviation avoidance control without limitation of the target yaw moment is continued.

Figure 12B:
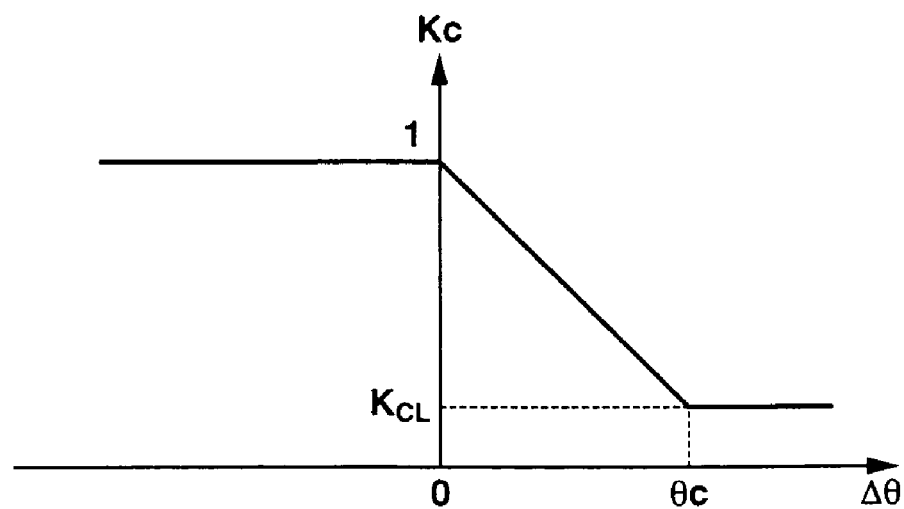

On the other hand, in a case where the driver operates the steering wheel in such a way that the vehicle is further deviated toward the inner side of the turning, deviation Δθ of the steering wheel before and after the deviation avoidance becomes equal to or larger than 0. As shown in FIG. 12(B), target moment correction gain Kc is set to a value smaller than 1 and the target yaw moment is limited. Hence, when the vehicle is in the deviation state toward the inner side of the turning and the steering angle is varied in the deviation direction, the correction processing such that the target yaw moment is immediately limited is carried out. Hence, the controlled variable of the deviation avoidance control against the intentional steering increase of the steering wheel is immediately limited. Thus, the driver can intervene the steering without giving the unpleasant feeling by the driver.

As described above, in the second embodiment, controller 8 calculates the ideal steering angle required to turn the curve during the traveling in accordance with the curvature of the traveling traffic lane of the vehicle and does not limit the controlled variable of the deviation avoidance control until the deviation of the steering angle before and after the deviation avoidance control has reached to the same magnitude as the ideal steering angle. Hence, even if the vehicle is being turned and has the tendency of deviation toward the outer side of the turning and the driver loosens the steering force so that the steering wheel is returned to the neutral direction, the unintentional limitation of the controlled variable of the deviation avoidance control is suppressed so that the effect of the deviation avoidance control can be maintained at maximum.

In addition, in a case where the deviation of the steering angle before and after the deviation avoidance control is increased in the deviation direction, the controlled variable of the deviation avoidance control is limited only if the vehicle tends to be deviated toward outside of the turning. Hence, the controlled variable of deviation avoidance control can immediately be limited in the case where the vehicle has the tendency of deviating toward the inner side of the turning. The unpleasant feeling of the vehicle driver during the steering intervention can extremely be suppressed. It is noted that, on the basis of the traveling state of the vehicle and curvature ρ of the traveling traffic lane, a required controlled variable to make a travel in accordance with the curvature may be calculated and the controlled variable of the deviation avoidance control may be limited in accordance with the deviation between the required controlled variable calculated and the controlled variable of the deviation avoidance control. Thus, even if the controlled variable of the deviation avoidance is limited due to the steering intervention by the driver during the turning of the vehicle, the travel control in accordance with the curvature is carried out so that the behavior of the vehicle can be difficult to be disordered.

At this time, in a case where the driver carries out the steering intervention for a long period of time, there is a possibility of obstructing the operation of the driver. Hence, deviation avoidance controlled variable may be limited in accordance with the required controlled variable calculated on the basis of the traveling state of the vehicle and curvature ρ of the traffic lane. Thus, a stability of the vehicular motion and easiness in steering intervention of the driver is compatible as high as possible. It is noted that, in each embodiment, the case where the target moment correction gain is calculated in accordance with only the deviation of the steering angle before and after the deviation avoidance control. However, the present invention is not limited to this. The target moment correction gain may be calculated in accordance with one of the road block lines which is toward the deviation side.

In this case, the vehicular surrounding sensor detects the road block line o9f the traveling traffic lane and determines a protrusion inhibit block line (solid line) for the vehicle to be inhibited from being protruded. In a case where the vehicle tends to be deviated toward the broken line side and the deviation of the steering angles before and after the deviation avoidance control is increased toward the deviation direction, the target moment correction gain such as to limit the controlled variable of the deviation avoidance control immediately is calculated. In a case where the vehicle has the deviation tendency toward the solid line side and the deviation of the steering angle before and after the deviation avoidance control is increased toward the deviation direction, the target moment correction gain is set to "1" assuming that the deviation avoidance control is not limited. Thus, the steering intervention can easily be carried out for the broken line side across which the traffic lane change can freely be made and the deviation avoidance control can be assured for the solid line side which is a boundary to an edge of the road.

In addition, in each embodiment, in a case where the vehicle has the tendency of deviation, irrespective of the presence or absence of the limitation on the deviation avoidance controlled variable, the warning is always produced at a constant volume. The present invention is not limited to this. When the correction processing to limit the controlled variable of the deviation avoidance control is carried out, the volume produced from the warning device may be set to be minor. Thus, in a case where the vehicle driver's intentional steering intervention is carried out so that the vehicle has the tendency of the deviation from the traffic lane, the volume of the warning sound becomes small. Hence, the vehicle driver does not feel the troublesome. Furthermore, in each embodiment, the braking torque control controls the vehicular yaw moment by means of the braking torque control so as to prevent the traffic lane deviation. The present invention is not limited to this. The steering control may prevent the traffic lane deviation.

In each embodiment, yaw moment Ms in the deviation avoidance direction is developed on the vehicle only by controlling braking pressure $P_{SFL}$ through $P_{SRR}$ of respective road wheels 5FL, 5FR, 5RL, and 5RR. The present invention is not limited to this. In a case where braking force control unit which is enabled to control driving forces of respective road wheels 5FL through 5RR is mounted in the vehicle, yaw moment Ms in the deviation avoidance direction by controlling the braking pressures and driving forces of respective road wheels 5FL through 5RR may be developed. Furthermore, in each embodiment, the present invention is applicable to rear road wheel drive vehicle. The present invention is applicable to a front road wheel drive vehicle. In this case, vehicular velocity V of the vehicle may be calculated from an average value of left and right road wheel velocities $V_{WFL}$ and $V_{WRR}$ which are non-driven wheels from among respective road wheel velocities $V_{WFL}$ through $V_{WRR}$.

The entire contents of a Japanese Patent Application No. 2003-384196 (filed in Japan on Nov. 13, 2003) are herein incorporated by reference. The scope of the invention is defined with reference to the following claims.

What is claimed is:

1. A lane keep control apparatus for an automotive vehicle, comprising:
   a traveling state detecting section that detects a traveling state of the vehicle;
   a deviation determining section that determines whether the vehicle has a tendency of a deviation from the traveling traffic lane according to the traveling state detected by the traveling state detecting section;
   a deviation preventive controlling section that executes a deviation avoidance control for the vehicle in a direction to avoid the deviation according to the traveling state detected by the traveling state detecting section;

a steering angle detecting section that detects steering angles before and after a start of the deviation avoidance control executed by the deviation preventive controlling section; and a deviation avoidance controlled variable correcting section that corrects a controlled variable of the deviation avoidance control executed by the deviation preventive controlling section on the basis of a deviation between a steering angle before the start of deviation avoidance control and that after the start of deviation avoidance control detected by the steering angle detecting section when the deviation determining section determines that the vehicle has the tendency of the deviation.

2. A lane keep control apparatus for an automotive vehicle as claimed in claim 1, wherein the lane keep control apparatus further comprises: a curvature detecting section that detects a curvature of the traveling traffic lane on which the vehicle is traveling; and a required controlled variable calculating section that calculates a required controlled variable of the deviation avoidance control required to make a travel in accordance with the curvature of the traffic lane on which the vehicle is traveling on the basis of the traveling state detected by the traveling state detecting section and the curvature detected by the curvature detecting section and wherein the deviation avoidance controlled variable correcting section corrects the controlled variable of the deviation preventive controlling section on the basis of the deviation between the steering angle before the start of deviation avoidance control and that after the start of deviation avoidance control, both being detected by the steering angle detecting section, and the required controlled variable calculated by the required controlled variable calculating section.

3. A lane keep control apparatus for an automotive vehicle as claimed in claim 1, wherein the deviation avoidance controlled variable correcting section corrects the controlled variable of the deviation avoidance control to be decreased when the deviation between the steering angle before the deviation avoidance control and that after the deviation avoidance control is increased toward the direction of deviation tendency of the vehicle.

4. A lane keep control apparatus for an automotive vehicle as claimed in claim 3, wherein the lane keep control apparatus further comprises an ideal steering angle calculating section that calculates an ideal steering angle on the basis of a curvature detected by a curvature detecting section and wherein the deviation avoidance controlled variable correcting section suppresses the decrease correction of the controlled variable of the deviation avoidance control by means of the deviation preventive controlling section when the deviation of the steering angles before the start of and after the deviation avoidance control detected by the steering angle detecting section is increased in a direction that the vehicle has the tendency of the deviation.

5. A lane keep control apparatus for an automotive vehicle as claimed in claim 3, wherein the deviation avoidance controlled variable correcting section corrects the controlled variable of the deviation avoidance control executed by the deviation preventive controlling section to be decreased immediately when the steering angle deviation before and after the deviation avoidance control is increased toward the deviation direction of the vehicle when the deviation determining section determines that the vehicle has the tendency of the deviation and the deviation direction is a deviation toward an inner side of a turning.

6. A lane keep control apparatus for an automotive vehicle as claimed in claim 3, wherein the lane keep control apparatus further comprises a protrusion inhibit block line detecting section that detects a road block line that inhibits a protrusion of the vehicle and wherein the deviation avoidance controlled variable correcting section suppresses the decrease correction of the controlled variable of the deviation avoidance control executed by the deviation preventive controlling section when the steering angle deviation before the start of and after the deviation avoidance control detected by the steering angle controlling section is increased toward the deviation direction of the vehicle when the deviation determining section determines that the vehicle has the tendency of the deviation and the road block line in the deviation direction is the protrusion inhibit block line detected by the protrusion inhibit block detecting line and corrects the controlled variable of the deviation avoidance control executed by the deviation preventive controlling section to be decreased when the road block line in the deviation direction is non-protrusion inhibit block line.

7. A lane keep control apparatus for an automotive vehicle as claimed in claim 1, wherein the lane keep control apparatus further comprises a warning section that produces a warning when the deviation determining section determines that the vehicle has the deviation tendency, the warning section setting a warning sound to be small when the deviation avoidance controlled variable correcting section corrects the controlled variable of the deviation avoidance control by means of the deviation preventive controlling section to be decreased.

8. A lane keep control apparatus for an automotive vehicle as claimed in claim 1, wherein the deviation determining section determines that the vehicle has the tendency of the deviation when an absolute value of a future estimated lateral displacement |Xs| is equal to or larger than a predetermined lateral displacement limitation value (Xc).

9. A lane keep control apparatus for an automotive vehicle as claimed in claim 8, wherein the deviation determining section further comprises: a traffic lane change determining section that determines whether a sign of the future estimated lateral displacement Xs is made coincident with a sign of a vehicular direction indicator switch signal (WS) to determine whether the vehicle is making a traffic lane change; and a traffic lane deviation state determining section that determines whether the absolute value (|Xs|) of the future deviation estimated lateral displacement is equal to or larger than a warning determination threshold value Xw to determine whether the vehicle is in a traffic lane deviation state.

10. A lane keep control apparatus for an automotive vehicle as claimed in claim 9, wherein the deviation preventive controlling section executes a calculation of a target yaw moment (Mso) required to avoid the traffic lane deviation state of the vehicle on the basis of the future estimated value (Xs) and the predetermined lateral displacement limitation value (Xc).

11. A lane keep control apparatus for an automotive vehicle as claimed in claim 10, wherein the target yaw moment Mso is expressed as follows: $Mso = -K1 \times K2 \times (Xs - Xc)$, wherein K1 denotes a constant determined according to a vehicle specification and K2 denotes a gain varied in accordance with a vehicular velocity (V).

12. A lane keep control apparatus for an automotive vehicle as claimed in claim 10, wherein the warning device produces a warning depending upon whether the future estimated lateral displacement (Xs) is positive larger than zero.

13. A lane keep control apparatus for an automotive vehicle as claimed in claim 10, wherein the deviation avoidance controlled variable correcting section comprises a target yaw moment correction section that corrects the target yaw moment (Mso) calculated by the deviation preventive controlling section on the basis of the steering angle deviation.

14. A lane keep control apparatus for an automotive vehicle as claimed in claim 13, wherein the target yaw moment correction section comprises: a sign determining section that determines if a sign of the target yaw moment (Mso) is positive or negative; a deviation calculating section that calculates the steering angle deviation ($\Delta\theta$) according to a result of the determination of the sign of the target yaw moment (Mso); a target yaw moment correction gain calculating section that calculates a target yaw moment correction gain (Kc) depending upon a magnitude of the steering angle deviation ($\Delta\theta$); and a final target yaw moment calculating section that calculates a target yaw moment after the correction (Ms) by multiplying the target moment correction gain (Kc) with the target yaw moment (Mso).

15. A lane keep control apparatus for an automotive vehicle as claimed in claim 14, wherein the deviation calculating section calculates the steering deviation ($\Delta\theta$) as follows:
when Mso <0, $\Delta\theta=\theta_1-\theta$, wherein $\theta_1$ denotes the steering angle before the start of the deviation avoidance control and $\theta$ denotes the present steering angle; and when Mso>0, $\Delta\theta=\theta_1-\theta$; and when Mso=0, $\theta_1=\theta$; and when Mso=0, $\theta_1=\theta$, and the target yaw moment correction gain calculating section calculates the target yaw moment correction gain (Kc) as follows: when $0 \leq \Delta\theta < \theta c$, $$Kc = 1 - \frac{1-K_{CL}}{\theta_c}\Delta\theta,$$

wherein $\theta c$ denotes a predetermined value and $K_{CL}$ denotes a lower limit value of the target yaw moment correction gain; when $\Delta\theta \geq \theta c$, $Kc=K_{CL}$; and when $\Delta\theta>0$, Kc=1.

16. A lane keep control apparatus for an automotive vehicle as claimed in claim 15, wherein $K_{CL}<0$.

17. A lane keep control apparatus for an automotive vehicle as claimed in claim 14, wherein the deviation preventive controlling section comprises a front and rear road wheel side target braking liquid pressure difference calculating section that calculates front road wheel side braking liquid pressure differences $\Delta P_{SF}$ and $\Delta P_{SR}$ depending upon the magnitude of the target yaw moment after the correction (Ms); and a four wheel target braking pressure calculating section that calculates four road wheel target braking pressures ($P_{SFL}$, $P_{SFR}$, $P_{SRL}$, and $P_{SRR}$) with the front and rear road wheel side target braking pressure differences ($\Delta P_{SF}$ and $\Delta P_{SR}$) taken into consideration.

18. A lane keep control apparatus for an automotive vehicle as claimed in claim 14, wherein the target yaw moment correction section further comprises an offset steering angle calculating section that calculates an offset steering angle in accordance with a vehicular turning state and wherein the target yaw moment correction gain calculating section calculates the target yaw moment correction gain (Kc) on the basis of the steering angle deviation ($\Delta\theta$) and the offset steering angle ($\theta s$).

19. A lane keep control apparatus for an automotive vehicle, comprising:
traveling state detecting means for detecting a traveling state of the vehicle;
deviation determining means for determining whether the vehicle has a tendency of a deviation from the traveling traffic lane according to the traveling state detected by the traveling state detecting means;
deviation preventive controlling means for executing a deviation avoidance control for the vehicle in a direction to avoid the deviation according to the traveling state detected by the traveling state detecting means;
steering angle detecting means for detecting steering angles before and after a start of the deviation avoidance control executed by the deviation preventive controlling means; and
a deviation avoidance controlled variable correcting means for correcting a controlled variable of the deviation avoidance control executed by the deviation preventive controlling means on the basis of a deviation between a steering angle before the start of deviation avoidance control and that after the start of deviation avoidance control detected by the steering angle detecting means when the deviation determining means determines that the vehicle has the tendency of the deviation.

20. A lane keep control method for an automotive vehicle, comprising:
detecting a traveling state of the vehicle;
determining whether the vehicle has a tendency of a deviation from the traveling traffic lane according to the detected traveling state;
executing a deviation avoidance control for the vehicle in a direction to avoid the deviation according to the traveling state;
detecting steering angles before and after a start of the deviation avoidance control; and
correcting a controlled variable of the deviation avoidance control on the basis of a deviation between a steering angle before the start of deviation avoidance control and that after the start of deviation avoidance control when determining that the vehicle has the tendency of the deviation.

* * * * *